United States Patent [19]

Knestel

[11] Patent Number: 5,036,700
[45] Date of Patent: Aug. 6, 1991

[54] METHOD OF AND APPARATUS FOR DETERMINING THE ENGINE POWER OF AN AUTOMOTIVE VEHICLE

[75] Inventor: Anton Knestel, Hopferbach, Fed. Rep. of Germany

[73] Assignee: Maschinenbau Haldenwang GmbH & Co. KG, Hal Denwang, Fed. Rep. of Germany

[21] Appl. No.: 318,660

[22] Filed: Mar. 3, 1989

[30] Foreign Application Priority Data

Mar. 10, 1988 [DE] Fed. Rep. of Germany ....... 3808013

[51] Int. Cl.$^5$ .............................................. G01L 3/26
[52] U.S. Cl. ...................................................... 73/117
[58] Field of Search ................... 73/117, 117.1, 117.2, 73/862.09, 862.11, 862.19, 862.28, 118.1

[56] References Cited

U.S. PATENT DOCUMENTS

| | | | |
|---|---|---|---|
| 3,554,022 | 1/1971 | Geul | 73/117 |
| 4,158,961 | 6/1979 | Ben-David | 73/117 |
| 4,159,642 | 7/1979 | Hudson et al. | 73/118.1 |
| 4,370,883 | 2/1983 | Coetsier et al. | 73/117 |
| 4,391,131 | 7/1983 | Scourtes | 73/118.1 |

FOREIGN PATENT DOCUMENTS 2904056 7/1980 Fed. Rep. of Germany .

Primary Examiner—Robert Raevis
Attorney, Agent, or Firm—Baker, Maxham, Jester & Meador

[57] ABSTRACT

A method of and an apparatus for determining the engine power of an automotive vehicle on a roller dynamometer, the rollers of which can be braked with a constant brake poower. In accordance with the invention, in a first measuring operation the net power of the engine acting on the vehicle wheels is determined by sensing the braking power acting on the dynamometer rollers. In a second measuring operation, the slowing-down time is measured within which the speed has decreased from a predetermined value to a second preselected value with unbraked dynamometer rollers. In a third measuring operation the dynamometer rollers are braked with a consant brake power and the slowing-down time is measured within which the speed has decreased from the initial value to the preset final value. Thereafter, the internal power loss of the automotive vehicle is calculated. The gross power of the vehicle engine may be determined by adding the calculated power loss to the previously measured net power.

1 Claim, 1 Drawing Sheet

METHOD OF AND APPARATUS FOR DETERMINING THE ENGINE POWER OF AN AUTOMOTIVE VEHICLE

FIELD OF THE INVENTION

The present invention is directed to a method of determining the engine power of an automotive vehicle on a roller dynamometer the rollers of which are adapted to be decelerated with a constant brake power, wherein in a measuring operation the net power acting on the vehicle wheels is determined by detection of the roller brake power.

BACKGROUND OF THE INVENTION

On conventional roller dynamometers it is possible merely to measure the net power of the vehicle engine acting on the vehicle wheels, but this net power includes the internal power loss of the respective vehicle. Basically, the amount of such power loss could be calculated on the basis of the resistances and the moments of inertia effective in the input train so that the actual gross power of the vehicle engine could be determined by addition of the measured net power and the calculated power loss. However, this method is not feasible in practice because the power loss depends on a large number of different parameters which vary for different vehicle types and also depends on the condition of the individual vehicle, such as wear of the components rotating in the input train, viscosity of the lubricants employed and condition of the bearings, among others.

On the other hand, the exact determination of the gross power of the vehicle engine provides information as to the respective state of the engine when the established values are compared with the manufacturer's specifications. The same holds in respect of a practical determination of the power loss which permits inferences on the state of the power transmission, for example, the manual transmission, the differential, the bearings, etc. Until recently, the gross power of a vehicle engine could be determined with sufficient accuracy only after decoupling of the input train and by means of power measurement direct at the engine output shaft. But such a test can only be performed on special engine test stands, and normally it can only be performed with a completely dismounted drive assembly. The effort required therefor usually is beyond the means of normal repair and maintenance shops.

SUMMARY OF THE INVENTION

It is a primary object of the present invention to provide a method of testing the engine power of an automotive vehicle, the method permitting in a simple way and under practical conditions the individual accurate determination of the power loss and the gross power of the respective vehicle. Furthermore, a test stand is to be provided on which the gross power of a vehicle engine as well as the internal power loss of the respective vehicle can be determined quickly and without any difficulty while the engine need not be dismounted.

The method according to the present invention solves the specified object by the feature that in a first measuring operation the net power of the engine acting on the vehicle wheels is determined by sensing the braking power acting on dynamometer rollers. In a second measuring operation the slowing-down time $t_1$ is determined during which the speed has decreased from a predetermined value $v_1$ to a second preselected value $v_2$ in the unbraked condition. In a further measuring operation the rollers of the dynamometer are braked with a constant brake power and the slowing-down time $t_2$ is measured within which the speed has decreased from the value $v_1$ to the value $v_2$. Subsequently the internal power loss of the automotive vehicle is calculated and is added to the measured net power.

BRIEF DESCRIPTION OF THE DRAWING

The objects, advantages and features of the invention will be more readily perceived from the following detailed description, when read in conjunction with the accompanying single drawing figure, in which the roller dynamometer apparatus of the invention is shown in schematic form.

DESCRIPTION OF THE PREFERRED EMBODIMENTS

Figures 1A, 1B:
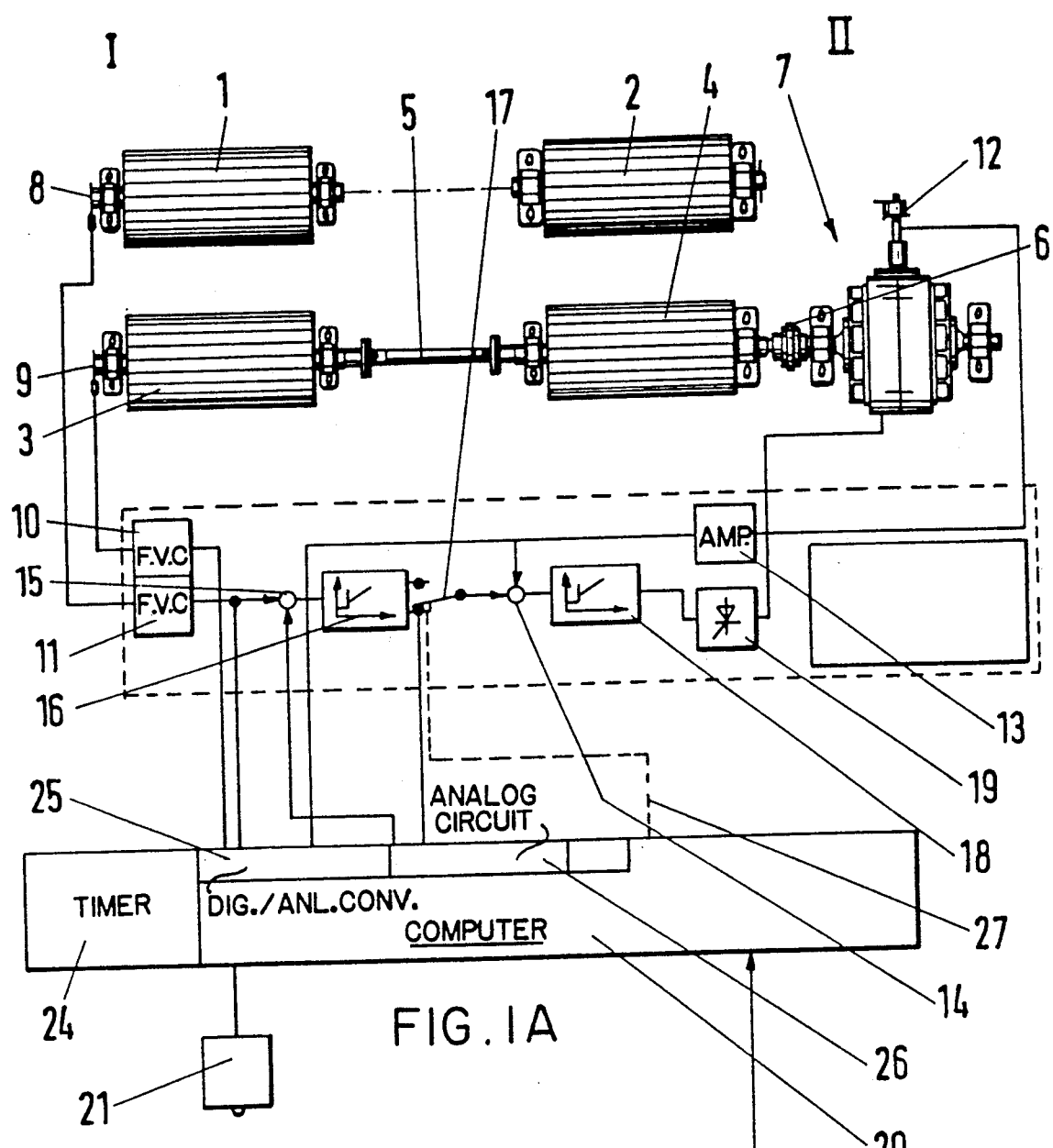

The present invention is based on the realization that the resistances and moments of inertia in the drive train of an automotive vehicle, which determine the internal power loss, are practically constant for respective identical speed ranges regardless of the magnitude of the respective brake power of the rollers, provided the test conditions and the parameters of the automotive vehicle, such as the lubricant viscosity, the selected gear, etc., are not changed. By repeating the test with different brake power levels, for instance with released brakes or only a slight constant brake power in the second test operation, and by computational combination of the results of the various measuring operations, it is possible to eliminate the influence of all of the rotating masses which participate in the slowing-down process and which are reduced to the drum radius.

In the apparatus shown in the drawing, only two roller pairs I and II of the roller dynamometer are illustrated. One respective roller 1, 2 of each pair is freely supported and the respective other rollers 3, 4 are coupled to each other by means of intermediate shaft 5 and to eddy-current brake 7 through flexible coupling 6. The vehicle to be tested is driven into the dynamometer so that the two wheels of its driven axle rest on the roller pairs I and II, respectively. As shown, each of the shafts of the two rollers 1 and 3 is provided with an incremental tachometer 8, 9 for providing frequency signals proportional to the vehicle speed to respective frequency-to-voltage converters 11 and 10. Eddy-current brake 7 has brake power sensor 12 mounted thereon for providing output signals by means of amplifier 13 to interface 14. The output signals from the two frequency-to-voltage converters 10, 11 are delivered directly to converter 25 in the computer. The output of converter 11 passes through interface 15 to speed governor 16 which keeps the test speed constant for varying power values and has two outputs. The technical reason for these converter connections is that rollers 1 and 2 are freely driven by the vehicle wheels and only rollers 3 and 4 are coupled with brake 7, so that the speed or velocity measured by tachometer 8 is the real peripheral speed of the wheels without slippage.

Switch 17 for changing over from speed to traction governing mode is adapted to connect one of the governor outputs to interface 14 and, through traction governor 18 for keeping constant the load at varying speeds, to driver 19 for controlling current supply to eddy-current brake 7. The aforementioned components 10–19 are integrated in a common control unit.

Computer 20 is connected to one of the outputs of speed governor 16 and to interface 15, the computer performing the various calculations required in the various test operations for calculating the power loss of the respective tested automotive vehicle and/or the gross power of the vehicle engine. The computer may be controlled by a remote control, receiver 21 of which is connected to computer 20, and transmitter 22 of which may be a hand-held appliance with a keyboard. Printer 23 is connected to computer 20 for printing test sheets. Computer 20 cooperates with timer 24 for counting the slowing-down time between two speed values, with digital-to-analog converter 25, with analog circuit 26, and with output channel 27 for preselecting the test speed or the traction.

The internal power loss of the automotive vehicle is calculated in accordance with the following equation:

$$P_x(v) = F_1 \cdot v \qquad \text{Eq. 1}$$

In the above equation:
Px(v) = power loss at a given vehicle speed "v"
v = vehicle speed
$F_1$ = the braking moments inherent in the vehicle and the rolling friction between the vehicle wheel and the dynamometer roller
In the following relationship $$m = \frac{F_1 \cdot t_1}{v_1 - v_2} \qquad \text{Eq. 2}$$

which holds for the first test operation with unbraked wheels and/or rollers, m is the sum of all rotating masses participating in the slowing-down process and reduced to the drum radius, which is considered as practically constant for the test operation within the selected speed interval $v_1 - v_2$. It is, however, a prerequisite that the lubricant temperature in the manual transmission, the differential and the bearings be constant. In the first test operation only the slowing-down time $t_1$ is measured within which, with the brakes released, the speed has decreased from the initial value $v_1$ to the set final value $v_2$. The factor $F_1$ in the above relationship characterizes the braking moments inherent in the vehicle and the rolling friction between vehicle wheel and dynamometer roller.

For the second test operation the vehicle engine is accelerated in the same gear as in the first test operation until the fictitious vehicle speed $v_1$ has been reached and/or slightly exceeded. Thereafter, the dynamometer rollers are braked with a constant brake force $F_2$ by means of the eddy-current brake of the roller dynamometer, and the time interval $t_2$ is measured within which the fictitious vehicle speed has decreased from the initial value $v_1$ to the set final value $v_2$. In both test operations the speed values $v_1$ and $v_2$ are the same. For this test operation there holds the following relationship:

$$m = \frac{(F_1 + F_2) \cdot t_2}{v_1 - v_2} \qquad \text{Eq. 3}$$

By equating the two aforespecified relationships one obtains:

$$F_1 = \frac{F_2 \cdot t_2}{t_1 - t_2} \qquad \text{Eq. 4}$$

In the above equation, $F_1$ again indicates the overall resistance effective along the rolling radius during the test operation, which can be calculated from the predetermined brake force $F_2$ and the measured time intervals $t_1$ and $t_2$. The internal power loss $P_x$ of the automotive vehicle is then determined from Eq. 1, except that $F_1$ in that equation is replaced by $F_1$ from equation 4, to provide the following form:

$$P_x = \frac{F_2 \cdot t_2 \cdot v}{(t_1 - t_2) \cdot} \{kW\} \qquad \text{Eq. 5}$$

In the above equation:
$P_x$ = power loss at a given vehicle speed v
v = vehicle speed
$F_2$ = constant braking force at the dynamometer rollers
$t_1$ = slowing-down time with unbraked rollers in the speed interval and
$t_2$ = slowing-down time with braked rollers in the speed interval.

As only two time intervals have to be measured in addition to the setting of but a few values in the dynamometer control unit for performing the method of the present invention, this method may also be performed by unskilled personnel. The obtained measured values and the results obtained by the computations are sufficiently accurate to obtain significant data relating to the respective condition of the vehicle engine and the drive train. Still more information and enhanced accuracy may be obtained when several tests at respectively different speed ranges are performed for any one vehicle.

To stress how comparatively simple the invention is, note that the roller dynamometer according to the present invention for determining the engine power of an automotive vehicle comprises a pair of rollers for each driven vehicle wheel, a brake for the roller pairs capable of producing a constant brake power during the test operation, sensors for sensing the rotational speed of the rollers and/or the vehicle wheels and the brake powers acting on the rollers, and a control unit which keeps the brake powers constant at the set value during a test operation. It also includes a computer which calculates the power loss $P_x$ on the basis of the measured times $t_1$ and $t_2$, the set constant roller brake force $F_2$, and an initial speed $v_x$ in accordance with the following relationship:

$$P_x = \frac{F_2 \cdot t_2 \cdot v_x}{(t_1 - t_2) \cdot} \{kW\} \qquad \text{Eq. 6}$$

It is an advantage of the present invention that already existing roller dynamometers may be retrofitted with but little technical effort so as to be capable of measuring the gross power of a vehicle engine and the power loss in the drive train of the automotive vehicle, which has not been possible so far. This applies especially to heavy roller dynamometers for trucks and buses, where the moments of inertia of the rotating and/or moving parts of the dynamometer, such as the rotating roller pairs, the shafts interconnecting them to each other and to the brake, and the rotating parts of the employed eddy-current brake, are high and their influence on the measured power values is eliminated by the procedure according to the present invention. With this setup the results obtained on a roller dynamometer according to the present invention exclusively reflect the power values specific for the respective automotive vehicle under test.

In view of the above description, it is likely that modifications and improvements will occur to those skilled in the art which are within the scope of the appended claims.

What is claimed is:

1. A roller dynamometer for determining the engine power loss of an automotive vehicle, said dynamometer comprising:
 a pair of rollers for each drive-vehicle wheel;
 a brake for each pair of rollers;
 sensors for sensing the rotational speed and the brake powers acting on said pair of rollers;
 a control unit for each said brake, said control unit including a brake power regulator for keeping the brake power acting on the rollers constant at a preset value; and
 a computer with which said control unit cooperates for calculating the power loss on the basis of measured slowing-down times, adjusted roller brake force, and initial speed in accordance with the following relationship:

$$P_x(v) = \frac{F_2 \, t_2 \, v}{(t_1 - t_2)}$$

Wherein
$P_x(v)$ = power loss at a given vehicle speed v
$F_2$ = set constant dynamometer roller brake force
v = initial vehicle speed
$t_1$ = slowing-down time with unbraked rollers
$t_2$ = slowing-down time with constantly braked rollers.

* * * * *